United States Patent [19]

Shriver et al.

[11] 4,048,792
[45] Sept. 20, 1977

[54] ROW CROP MEANS FOR A HARVESTING UNIT

[75] Inventors: Joe E. Shriver; Donald O. Norman, both of East Earl, Pa.

[73] Assignee: Sperry Rand Corporation, New Holland, Pa.

[21] Appl. No.: 713,327

[22] Filed: Aug. 11, 1976

[51] Int. Cl.$^2$ .............................................. A01D 45/02
[52] U.S. Cl. ........................................................ 56/98
[58] Field of Search ............................... 56/13.9–14.6, 56/51–119

[56] References Cited

U.S. PATENT DOCUMENTS

| | | | |
|---|---|---|---|
| 3,388,538 | 6/1968 | Markham | 56/98 |
| 3,791,117 | 2/1974 | Lawrence | 56/98 |
| 3,803,820 | 4/1974 | Knapp | 56/98 |
| 3,807,152 | 4/1974 | Storm et al. | 56/98 |

Primary Examiner—Russell R. Kinsey
Attorney, Agent, or Firm—Michael R. Swartz; Frank A. Seemar; John B. Mitchell

[57] ABSTRACT

A forage harvester row crop header having fore-and-aft dividers defining elongated passageways therebetween is provided with a rotary member disposed within a pocket defined in a rear portion of one of the outboard dividers to assist in the feeding of crop along the passageway. The rotary member is capstan shaped having its axis of rotation inclined upwardly and rearwardly with respect to the top surface of the respective outboard divider. The lower surface of the rotary member forms a smooth transition with the top surface of the divider and thus, in profile, the divider and the rotary member are represented by a line which gradually slopes, from the forward end of the divider upwardly and rearwardly and therefrom smoothly contours upwardly and rearwardly a short distance and therefrom upwardly and forwardly, thereby providing a substantially uninterrupted surface for the flow of draped over crop along the divider and the rotary member. The rotary member is power driven to feed the crop inwardly toward the passageway.

19 Claims, 4 Drawing Figures

ROW CROP MEANS FOR A HARVESTING UNIT

BACKGROUND OF THE INVENTION

1. Field of the Invention

The present invention relates generally to a row crop attachment for a forage harvester and, more particularly, is directed to an improved row crop attachment or header which is adapted to harvest down and tangled row crops, such as corn.

2. Description of the Prior Art

Frequently, during corn harvest, the cornstalks are down and bent over, the stalks of one row laying across and entangled with the stalks of an adjacent row. Such down crop condition creates a problem in harvesting in that as the crop dividers move between adjacent rows the down stalks drape over the divider. The drapped over portions of the stalks are dragged along and over the divider as the stalks are conveyed rearwardly along the passageway by the gathering chains that grip the lower portions of the stalks to feed the same into the harvester, butt-end first. The draped-over stalks tend to wrap around the divider and bunch up about the rear end thereof, adjacent the discharge throat of the row crop header. This wrapping and bunching of the stalks causes jamming, resulting in high power requirements and an uneven feeding of the stalks to the harvester. Further, many stalks are lost and damaged due to the binding of the stalks over the divider which tears some of the stalks apart and pulls others out of the grip of the gathering chains.

Various row crop headers with a rotating member mounted on an end of an outboard divider, have been proposed to assist in the feeding of the stalks such as disclosed in U.S. Pat. Nos. 3,388,538; 3,791,117; 3,803,820 and 3,807,152. While these prior art devices tend to somewhat alleviate the problems experienced in harvesting the down crops, they are not the ultimate solution in that their configuration and positioning creates a pinch or blockage area that wedges and collects the down stalks causing bunching and jamming thereof. Such proposed devices do not provide for a smooth flow of the stalks along the divider and the rotary member which is essential for the achievement of a continuous, uninterrupted feeding of the stalks to the harvester.

SUMMARY OF THE INVENTION

The present invention sets forth an improved row crop means for harvesting row crops, and particularly crops lying in a down condition, such as corn stalks that are bend over and entangled with the stalks of an adjacent row. The row crop means incorporates an improvement which facilitates continuous, uninterrupted smooth feeding of cro stalks to the harvester.

More particularly, an improved row crop means is provided for a mobile harvesting unit being adapted to advance over a field of a crop planted in rows and having a frame with fore-and-aft crop dividers mounted thereon and laterally spaced so as to define a crop passageway therebetween to receive a row of crop as the unit advances over a field. Gathering conveyors are disposed on opposite sides of each passageway for engaging the crop therein and conveying the same rearwardly along the passageway to feed the crop to the harvesting unit.

In the preferred embodiment, the top surface of one of the outboard dividers is inclined upwardly and rearwardly with its rear portion cut away to form a pocket or recess area for the disposition of a rotary member to assist in the feeding of crop along the passageway. The pocket is defined by a surface having a downwardly and rearwardly sloping portion and an upwardly and rearwardly inclined portion extending therefrom.

The improvement provided by the present invention relates to the configuration and position of the rotary member with respect to its respective divider member. Preferably, the rotary member is capstan shaped with its axis of rotation being perpendicular to the downwardly and rearwardly sloping portion of the cut away portion and is positioned such that the lower portion of the capstan forms a smooth transition with the top surface of the divider. In profile, the rotary member and the divider are represented by a line which gradually slopes, from the forward end of the divider, upwardly and rearwardly and therefrom smoothly contours upwardly and rearwardly a short distance and therefrom upwardly and forwardly, thereby providing a substantially uninterrupted surface for the flow of draped over crop along the divider and the rotary member.

Due to the capstan shape of the rotary member and its relative positioning, draped-over crop slides upwardly and rearwardly along the top surface of the divider and then up and along the rotary member. The draped-over crop is prevented from moving over the top of the rotary member because of its downwardly and inwardly tapered top portion.

Other advantages and attainments of the present invention will become more apparent to those skilled in the art upon a reading of the following detailed description when taken in conjunction with the drawings in which there is shown and described an illustrative embodiment of the invention.

BRIEF DESCRIPTION OF THE DRAWINGS

In the course of the following detailed description, reference will be frequently made to the attached drawings in which.

DETAILED DESCRIPTION OF THE INVENTION

In the following description, right hand and left hand references are determined by standing at the rear of the machine facing in a direction of forward travel. Also, in the following description, it is to be understood that such terms as "forward," "rearward," "left," "upwardly," etc., are words of convenience and are not to be construed as limiting terms.

IN GENERAL

Figure 1:
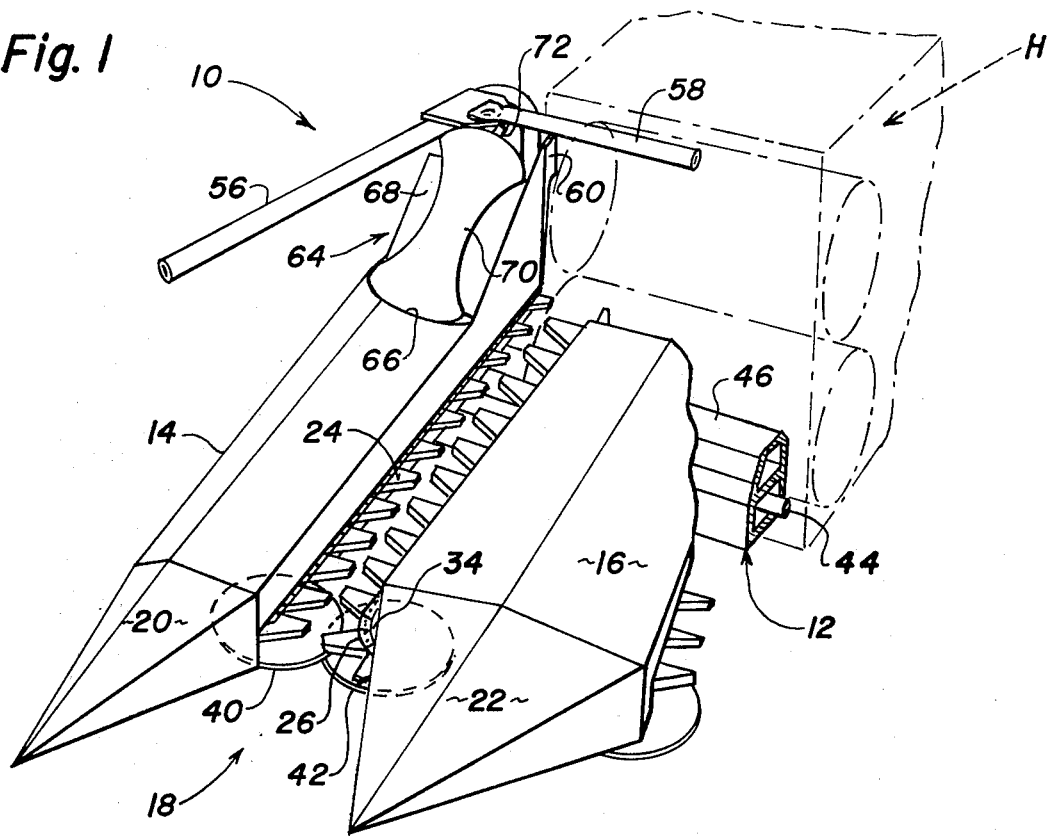
FIG. 1 is a fragmentary front perspective view of a row crop header embodying the invention and being shown mounted on the front portion of a forage harvester which is schematically illustrated in broken-line form.

Referring now to the drawings, and particularly to FIG. 1, there is shown a row-crop header, being indicated generally by the numeral 10, mounted on the forward portion of a forage harvester H which is only represented schematically in broken line form since it is conventional and forms no part of the present invention. As is well known, the forward portion of a harvester has an inlet opening, generally spanning the width thereof, with a feed roll assembly mounted rearwardly of the inlet opening. Crop material enters through the inlet opening to a front set of feed rolls that pass the material rearwardly to a rear set of feed rolls that deliver the material to a cylinder type cutterhead for reducing the crop. It should suffice to say, at this point, that the header 10 has a discharge opening and is mounted on the forward portion of the harvester such that the discharge opening is in communication with the inlet opening of the harvester.

While only the right portion of a multi-row crop header 10 has been shown in the drawings for purposes of illustrating the present invention, it should be understood that the invention is equally applicable to a single-row header.

Figure 2:
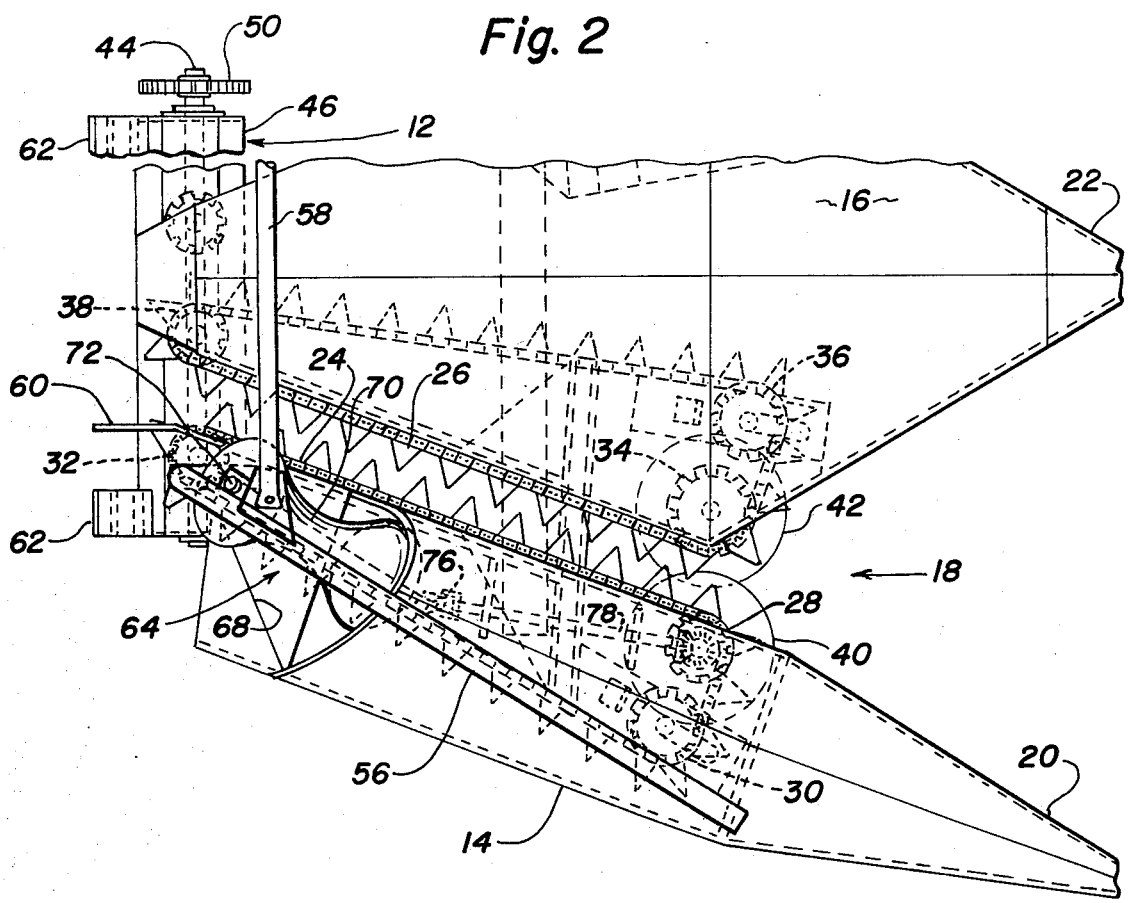
FIG. 2 is a top plan view of the row crop header of FIG. 1, being removed from the forage harvester.

The row-crop header 10 includes a frame 12 for supporting fore-and-aft extending gathering members or dividers 14,16 (only the right outboard and center divider being shown in FIGS. 1 and 2). The fore-and-aft dividers 14,16 are spaced laterally on frame 12 so as to define an elongated fore-and-aft crop passageway 18 between adjacent ones for receiving a row of crop as the harvester unit advances over a field. Preferably, the dividers 14,16 are of a sheet metal construction providing smooth surfaces for guiding of crops thereover and therealong with the top surface of the outboard divider 14 gradually sloping upwardly and rearwardly from front to rear and with the top surface of the center divider 16 being similarly inclined, but at a lesser slope and disposed at a lower elevation such that the top surface of the outboard divider 14 is somewhat higher than that of the adjacent center divider 16. The dividers 14,16 respectively have forwardly extending pointed snouts 20,22, the tips of adjacent snouts 20,22 being spaced apart wider than the width of the respective passageway 18 so as to guide the crop into the passageway. The rear portion of the outboard divider 14 will be discussed later on in conjunction with the discussion of the improvement provided by the present invention.

Figure 4:
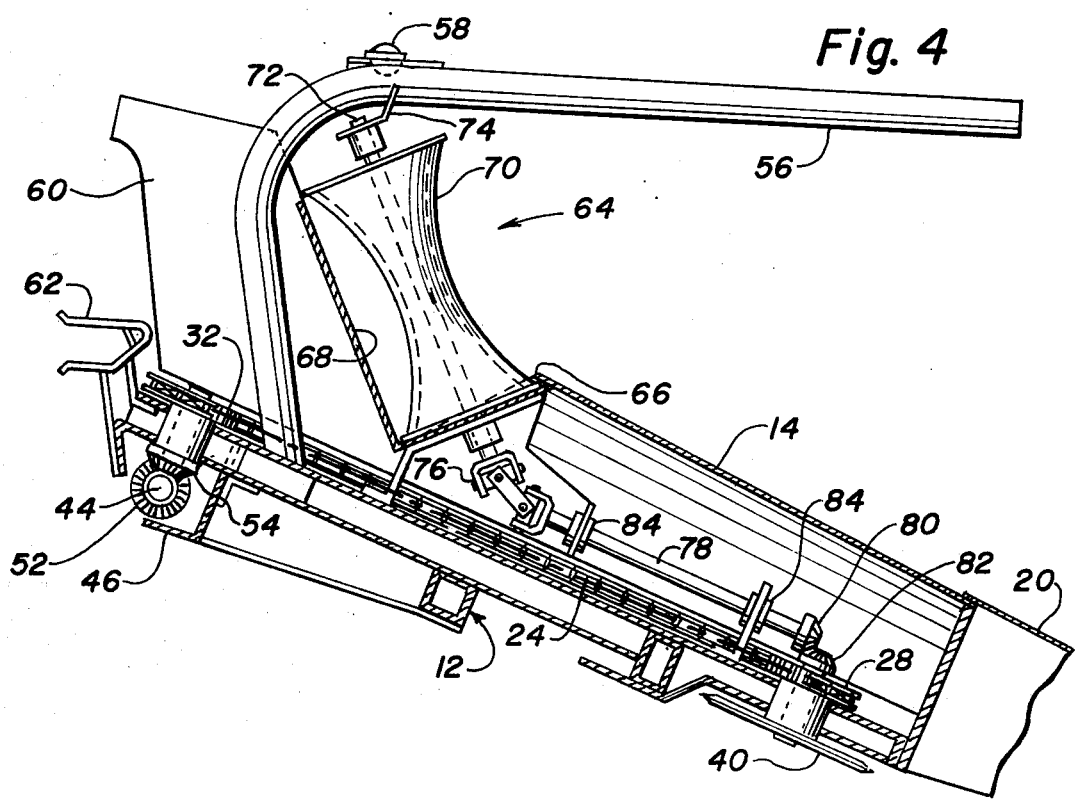
FIG. 4 is similar to FIG. 3 with the outer sheet metal removed to show the respective drives.

A pair of cooperating gathering chains 24,26 are respectively disposed on opposite sides of the passageway 18, each of which having inwardly projecting lugs for engaging the crop therein and moving the same rearwardly toward the discharge opening of the header 10. Each of the chains 24,26 are entrained around three sprockets 28,30,32 and 34,36,38 respectively, suitably mounted on frame 12 and best shown in FIGS. 2 and 4.

For severing the crop, the header 10 is provided with a cutting mechanism in the form of two rotary discs 40,42. The respective discs 40,42 are mounted on the lower ends of the shafts that support the front chain sprockets 28,34 and extend outwardly therefrom into the passageway 18 in an overlapping relationship to sever the crop as it enters the passageway.

The drive for the header 10 includes a transverse input shaft 44 housed within a box-shaped frame member 46 that spans across the lower rearward end of the header. Mounted on the left end of the input shaft 44 is a sprocket 50 which is connected by a chain (not shown) to a drive sprocket (not shown) on the harvester unit H. Spaced along the transverse input shaft 44 is an array of bevel gears 52 which driveably mate with corresponding bevel gears 54 mounted on the lower ends of the shafts that support the respective rear chain sprockets 32,38. Thus, power from the harvester unit is transmitted through the input shaft 44 and associated gears and sprockets to drive the gathering chains 24,26 rearwardly along the crop passageway 18 and to rotate the cutting discs 40,42 in opposite directions, inwardly toward the passageway.

The header 10 is further provided with a conventional stalk control device for engaging the upper portions of crop stalks and conveying the same inwardly as the unit advances. The stalk control device includes a pair of upwardly and forwardly extending arms 56, each of which is mounted at its lower end to frame 12 adjacent to the rear end of each of the respective outboard dividers 14 (only one of which being shown in FIG. 1). The arms 56 extend forwardly and diverge outwardly over each of the respective outboard dividers 14 and are interconnected at their point of forward curvature by a cross bar 58 which serves to block or prevent further rearward movement of the upper portion of stalks therebeyond.

Inwardly from the upright portion of each stalk control arm 56 and suitable attached to the inner side of each outboard divider is a sheet metal plate 60 which extends upwardly from frame member 46 (only the right plate being shown in the drawings). Each of the plates 60 forms a respective side of a throat area, defining the discharging opening of header 10.

For mounting the header 10 on the forward portion of the harvester unit H, conventional brackets 62 are secured to and extend from the lower frame member 46.

ROTARY FEED ASSIST MEMBER

The improvement provided by the present invention is a rotary member 64 and its unique position with respect to at least one of the dividers 14,16 of the row crop header for assisting in the feeding of down crop along the passageway 18 and into the discharge opening of header 10. In the preferred embodiment, only one rotary member is shown, being associated with the right outboard divider 14; however, it should be understood that the same could additionally be associated with other ones of the dividers.

As aforementioned, the top surface of outboard divider 14 is inclined upwardly and rearwardly. The rear portion of the divider 14 is cut away to provide the unique mounting location for the rotary member 64. More particularly, the cut-away is in the form of a pocket defined by a surface having a first portion 66 which slopes downwardly and rearwardly with respect to the top surface of the divider 14 and a second portion 68 which is inclined upwardly and rearwardly with respect to the first portion 66, the second portion 68 being generally perpendicular to the first portion 66.

Figure 3:
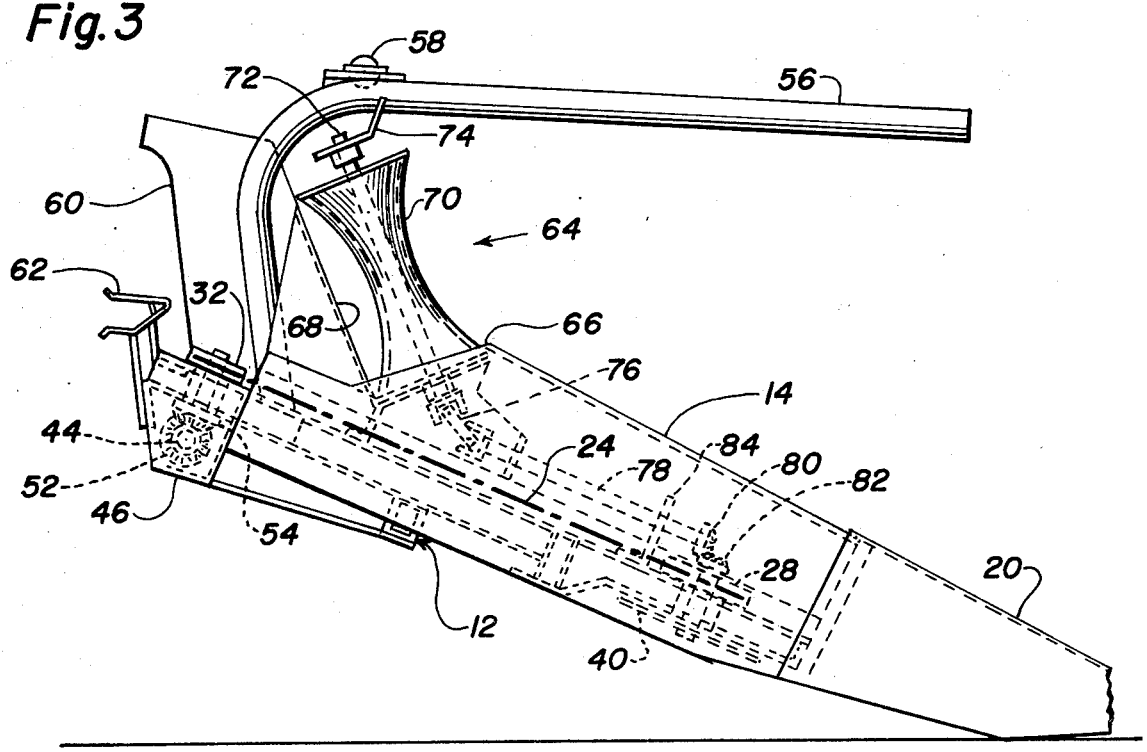
FIG. 3 is a side elevational view of the row crop header of FIG. 2 showing in profile the relationship of the rotary member with the top surface of the outboard divider.

Preferably, the rotary member 64 includes a capstan or hour-glass shaped drum 70 and a shaft 72 for mounting the drum within the cut-away segment. The shaft 72 is rotatably mounted at its lower end on the downwardly and rearwardly sloping first portion 66 of the cutaway segment and at its upper end to an upper bracket 74 attached to the stalk control arm 56 (best seen in FIGS. 3 and 4). The shaft 72 extends co-axially with the longitudinal axis of the drum 70 and is disposed upwardly and rearwardly with respect to the top surface of the divider 14 and is canted slightly inwardly such that the upper portion of the drum 70 is closer to the passageway 18 than the lower portion of the drum.

With such positioning of the shaft 72, the drum 70 is so disposed such that the front facing, lower portion, of the continuous surface of the drum forms a smooth transiton with the top surface of the divider 14. More specifically, the front facing portion of the drum 70 forms a substantially continuous path for sliding of draped-over down crop upwardly and rearwardly along the top surface of the divider 14 and therefrom upwardly and rearwardly along the front facing of the drum 70. In profile, as viewed in FIGS. 3 and 4, the divider 14 together with the drum 70 is represented by a line which gradually slopes, from the forward end of the divider 14, upwardly and rearwardly and therefrom smoothly contours upwardly and rearwardly a short distance and therefrom upwardly and forwardly, thereby providing a substantially uninterrupted surface for the smooth flow of draped over crop along the divider 14 and the rotary member 64.

The drum 70, being of capstan shape, tapers inwardly from its ends towards its center, or, in other words, the outer surface of drum 70 concaves inwardly such that its middle portion is of a less diameter than its outer end portions. Thus, due to the positioning of the rotary member 64 and the shape of its drum 70, draped-over down crop which has moved from the top surface of divider 14 onto the front facing surface of the drum 70 is thereby prevented from moving over the top of the rotary member 64. Further, the inward canting of the rotary member 64 tends to direct the draped-over crop toward the center of the discharge opening of header 10.

In its preferred embodiment, the rotary member 64 is power driven such that it rotates inwardly toward the passageway 18, in a counterclockwise direction as viewed in FIG. 1. The lower end of the shaft 72 extends through the downwardly and rearwardly first portion 66 of the cut-away segment of divider 14 and is driveably connected by a double U-joint connection 76 to one end of shaft 78 which has a bevel gear 80 mounted to its opposite end for driveably mating with bevel gear 82, mounted on the upper end of the shaft that supports the front chain sprocket 28. The shaft 78 extends fore-and-aft within the divider 14, below the top surface thereof, and is supported on members of frame 12 by bearing assemblies 84.

OPERATION

During operation, the row crop header 10 moves forwardly over a field of standing row crops, such as corn, with the dividers 14,16 moving between adjacent rows for guiding and directing the stalks into the passageway 18. As the stalks enter the passageway 18, the gathering chains 24,26 grip the lower portions of the stalks as the cutting discs 40,42 sever the stalks from the ground. The gathering chains 24,26 convey the stalks rearwardly along the passageway 18, butt-end first, toward the discharge opening of header 10 through which the stalks are fed to the feed rolls and thus the cylindrical cutter of the harvester unit H. As the gripping gathering chains 24,26 convey the crop rearwardly, the tall and upright stalks engage the cross bar 58 of the stalk control causing the stalks to swing forwardly in a generally fore-and-aft direction along the passageway 18 whereas the down and entagled stalks slide along the outboard divider 14.

The down stalks tend to drap over the divider 14 as the unit advances. As the butt-ends of the stalks are severed and conveyed rearwardly along the passageway 18 by the gathering chains 24,26, the drapped-over portions of the stalks slide rearwardly over and along the top surface of the outboard divider 14 and up and onto the forward facing surface of the rotary driven drum 70 which assists in the continuous feeding of the stalks to the harvester unit H. The stalks are prevented from wrapping around and bunching at the rear end of the divider due to the smooth transition provided by the rotary member 64. Furthermore, the rotary member is preferably power driven; however, it could be of the free wheeling type.

It thus, can be appreciated that the unique design and positioning of the rotary member 64 with respect to the divider 14 provides for a continuous, uninterrupted or unhesitating, flow of stalks rearwardly along the passageway and into the harvester unit H. The smooth transition between the top surface of the divider 14 and the forward facing rotary surface of drum 70 eliminates any abrupt change of direction of the stalks which otherwise would tend to cause the stalks to wrap around the divider and thus be pulled from the gripping of the gathering chains 24,26. Further, the shape of the drum 70, that being preferably capstan, and its position within the pocket or cut-away segment of the rear portion of the divider 14, serves not only in providing a smooth transition for the flow of the stalks, but further prevents the stalks from moving over the top of the rotary member 64.

It is thought that the invention and many of its attendant advantages will be understood from the foregoing description and it will be apparent that various changes may be made in form, construction and arrangement thereof without departing from the spirit and scope of the invention or sacrificing all of its material advantages, the form hereinbefore described being merely a preferred or exemplary embodiment thereof.

Having thus described the invention, what is claimed is:

1. In a row crop means for a mobile harvesting unit adapted to advance over a field of crop planted in rows, said means including a frame, laterally spaced generally fore-and-aft gathering members mounted on the frame defining at least one elongated fore-and-aft passageway adapted to receive a row of crop as the unit advances, each of said gathering members adapted to move crop rearwardly along the passageway to feed the crop to said unit, at least one of said gathering members having a relatively smooth upwardly and rearwardly inclined top surface adapted to slideably engage down crop as the unit advances, the improvement comprising: a rotary member disposed in a rear portion of at least one of said gathering members for assisting in the feeding of said down crop being draped over said member to said unit, said at least one gathering member having a cut-away portion on the rearward end thereof forming a recess area for positioning said rotary member such that the lower portion of said rotary member forms a substantially continuous path extending from said top surface of said at least one gathering member for the sliding of said draped-over crop rearwardly and upwardly from said member and onto said rotary member.

2. The row crop means as described in claim 1, wherein the rotary member is inclined upwardly and rearwardly with respect to the top surface of said gathering member.

3. The row crop means as described in claim 1, wherein the lower portion of said rotary member, from the bottom end thereof, slopes upwardly and tapers inwardly.

4. The row crop means as described in claim 1, wherein the lower portion of said rotary member forms a smooth transitional path for the flow of draped-over crop over the top surface of said gathering member and up and along said rotary member.

5. The row crop means as described in claim 1, wherein the upper portion of said rotary member, from the top end thereof, slopes downwardly and tapers inwardly such that said crop is prevented from moving up and over said rotary member.

6. The row crop means as described in claim 1, wherein said rotary member is capstan shaped.

7. The row crop means as described in claim 1, wherein the profile of said gathering member together with said rotary member is represented by a line which gradually slopes, from the forward end of said gathering member, upwardly and rearwardly and therefrom smoothly contours upwardly and rearwardly a short distance and therefrom upwardly and forwardly, thereby providing a substantially uninterrupted surface for the flow of draped over crop along said gathering member and said rotary member.

8. The row crop means as described in claim 1, wherein the axis of said rotary member is canted inwardly toward said passageway such that an upper portion of said rotary member is closer to said passageway then its lower portion.

9. In a row crop means for a mobile harvesting unit adapted to advance over a field of crop planted in rows, said means including, laterally spaced generally fore-and-aft gathering members mounted on the frame and defining at least one elongated fore-and-aft passageway adapted to receive crop as the unit advances, each of said gathering members adapted to move crop rearwardly along the passageway to feed the crop to said unit, at least one of said gathering members having a relatively smooth upwardly and rearwardly inclined top surface adapted to slideably engage down crop as the unit advances; the improvement comprising:
a rotary member disposed in a rear portion of at least one of said gathering members for assisting in the feeding of said down crop being draped over said member to said unit, said at least one gathering member having a pocket defined at the rearward end thereof by a downwardly and rearwardly sloping surface on which said rotary member is mounted so as to provide a rotating surface which is substantially a continuation of the top surface of said gathering member but increasing in slope such that the draped crop which moves rearwardly over the top surface of said gathering member continues upwardly on said rotary member which is adapted to rotate in a direction causing said crop to move rearwardly along said passageway.

10. The row crop means as described in claim 9, wherein the lower portion of said rotary member, from the bottom end thereof, slopes upwardly and tapers inwardly.

11. The row crop means as described in claim 9, wherein the lower portion of said rotary member forms a smooth transitional path for the flow of draped over crop over the top surface of said gathering member and up and along said rotary member.

12. The row crop means as described in claim 9, wherein the upper portion of said rotary member, from the top end thereof, slopes downwardly and tapers inwardly such that said crop moving up and along said rotary member is prevented from moving over the top of said rotary member.

13. The row crop means as described in claim 9, wherein the axis of said rotary member is canted inwardly toward said passageway such that the upper portion of said rotary member is closer to said passageway then its lower portion.

14. A row crop gathering head for a forage harvester unit comprising:
a. a frame having a discharge opening defined therein for the passage of crop from said gathering head into said harvester unit;
b. a plurality of crop dividers mounted on said frame and defining at least one crop passageway, at least one of said dividers having an upper edge surface angling upwardly from its front end towards its rear end, thereby providing a crop guiding surface for crop drapped over said divider as said unit advances forwardly over a field of row crops;
c. gathering conveyors respectively disposed on opposite sides of said passageway for engaging crop therein and moving the same rearwardly along said passageway; and
d. a rotary member mounted adjacent the rear end of said at least one divider and being inclined such that its lower portion forms a transition with the top surface of said at least one divider such that crop sliding over said top surface are not interrupted as the same are moved rearwardly along said passageway to said discharge opening.

15. The row crop gathering head as described in claim 14, wherein said rotary member is inclined upwardly and rearwardly with respect to the top surface of said divider.

16. The row crop gathering head as described in claim 14, wherein the upper portion of said rotary member from the top thereof slopes downwardly and tapers inwardly such that said crop is prevented from moving over the top of said rotary member.

17. The row crop gathering head as described in claim 14, wherein the axis of said rotary member is canted inwardly toward said passageway such that an upper portion of said rotary member is closer to said passageway than its lower portion.

18. A row crop unit for a forage harvester or the like adapted to be moved forwardly over a field of row crop comprising:
a. a frame having a rear discharge opening for the introduction of crop material to said harvester,
b. a plurality of fore-and-aft dividers mounted on the frame and defining at least one elongated passageway for receiving stalks of crops as the unit advances over the field, at least one of said dividers having a top surface which gradually slopes upwardly and rearwardly and then bends downwardly and rearwardly for a short distance and then upwardly and rearwardly to a top portion of said frame thereby forming a pocket in said top surface of said one divider,
c. a rotary member disposed within said pocket of said one divider having its axis of rotation generally perpendicular to the rearward downwardly sloping portion of said top surface of said one divider and having its outer surface meeting with the top surface of said one divider to thereby form a rearward and upwardly inclined continuous path for the sliding over of down crop stalks toward said discharge opening.

19. The row crop unit as described in claim 18, wherein said rotary member is hour-glassed shaped.

* * * * *